(12) United States Patent
Kobayashi et al.

(10) Patent No.: US 8,287,431 B2
(45) Date of Patent: Oct. 16, 2012

(54) VEHICULAR CONTROL APPARATUS AND VEHICULAR CONTROL METHOD

(75) Inventors: Nobufusa Kobayashi, Chiryuu (JP); Toshio Sugimura, Ann Arbor, MI (US); Tomohiro Asami, Nissin (JP); Takaaki Tokura, Nagoya (JP); Yoshio Hasegawa, Chiryuu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 519 days.

(21) Appl. No.: 12/450,471

(22) PCT Filed: Apr. 1, 2008

(86) PCT No.: PCT/IB2008/000764
§ 371 (c)(1),
(2), (4) Date: Oct. 21, 2009

(87) PCT Pub. No.: WO2008/120087
PCT Pub. Date: Oct. 9, 2008

(65) Prior Publication Data
US 2010/0056332 A1    Mar. 4, 2010

(30) Foreign Application Priority Data
Apr. 2, 2007  (JP) .................................. 2007-096533

(51) Int. Cl.
*B60W 10/04* (2006.01)
*B60W 10/10* (2006.01)
*F16H 61/16* (2006.01)
*F16H 61/18* (2006.01)
*G06F 7/00* (2006.01)
*G06F 17/00* (2006.01)
*G06F 19/00* (2011.01)

(52) U.S. Cl. .......... 477/110; 477/115; 477/125; 701/51; 701/53; 701/54; 701/59; 701/62; 701/66

(58) Field of Classification Search .................... 477/68, 477/110, 115–117, 121, 125, 151; 701/51, 701/53, 54, 59, 61, 62, 66
See application file for complete search history.

(56) References Cited

U.S. PATENT DOCUMENTS

| 5,669,849 A * | 9/1997 | Tabata et al. .................. 477/102 |
| 5,879,268 A | 3/1999 | Yasue et al. |
| 2003/0022756 A1 | 1/2003 | Ayabe et al. |
| 2003/0027679 A1 * | 2/2003 | Sakamoto et al. ............ 475/120 |
| 2004/0106500 A1 * | 6/2004 | Ayabe et al. ................... 477/117 |

(Continued)

FOREIGN PATENT DOCUMENTS
EP    0 351 824 A2   1/1990
(Continued)

*Primary Examiner* — Tisha Lewis
(74) *Attorney, Agent, or Firm* — Oliff & Berridge, PLC (57) ABSTRACT

When shifting an automatic transmission into a higher gear, it is determined that an inertia phase has started when an input rotation speed of the automatic transmission has started to decrease. Here, if throttle opening amount reduction control is being performed to reduce the output torque of the engine when it is determined that the inertia phase has started, it is highly likely that that determination is erroneous because that control causes the input rotation speed of the automatic transmission (i.e., the engine speed) to decrease. When it is highly likely that the determination that the inertia phase has started is erroneous in this way, learning of a hydraulic pressure command value is prohibited. As a result, erroneous learning of the hydraulic pressure command value can be prevented.

6 Claims, 5 Drawing Sheets

U.S. PATENT DOCUMENTS

2010/0250074 A1 * 9/2010 Hirasako et al. ................ 701/55

FOREIGN PATENT DOCUMENTS

| JP | A-2-57438 | | 2/1990 |
| JP | 02304262 A | * | 12/1990 |
| JP | A-7-81462 | | 3/1995 |
| JP | B2-2591007 | | 12/1996 |
| JP | A-9-126312 | | 5/1997 |
| JP | B2-2615899 | | 6/1997 |
| JP | A-10-184410 | | 7/1998 |
| JP | A-11-37267 | | 2/1999 |
| JP | B2-3536537 | | 6/2004 |

* cited by examiner

|  | C1 | C2 | B1 | B2 | B3 | F |
|---|---|---|---|---|---|---|
| REVERSE |  |  |  | ○ | ○ |  |
| 1ST GEAR | ○ |  |  | ◎ |  | ○ |
| 2ND GEAR | ○ |  | ○ |  |  |  |
| 3RD GEAR | ○ |  |  |  | ○ |  |
| 4TH GEAR | ○ | ○ |  |  |  |  |
| 5TH GEAR |  | ○ |  |  | ○ |  |
| 6TH GEAR |  | ○ | ○ |  |  |  |

FIG. 5

VEHICULAR CONTROL APPARATUS AND VEHICULAR CONTROL METHOD

BACKGROUND OF THE INVENTION

The disclosure of Japanese Patent Application No. 2007-096533 filed on Apr. 2, 2007, including the specification, drawings and abstract is incorporated herein by reference in its entirety.

1. Field of the Invention

The invention relates to a vehicular control apparatus and a vehicular control method.

2. Description of the Related Art

In a vehicle such as an automobile, rotation from an internal combustion engine side is transmitted to the wheel side via an automatic transmission. This automatic transmission includes a torque converter and a gear shift mechanism, and establishes a plurality of gears with different gear ratios by selectively applying a plurality of apply elements such as clutches and brakes so as to switch the power transmitting path in the gear shift mechanism.

The apply elements such as the clutches and brakes operate based on the hydraulic pressure of hydraulic fluid that is supplied through a hydraulic control circuit, and are switched between an applied state and a released state by adjusting this hydraulic pressure through controlling the operation of various solenoid valves provided in this hydraulic control circuit. The gear (i.e., speed) of the automatic transmission is shifted by operating the apply elements in the following manner. That is, in response to a shift command, hydraulic pressure applied to a predetermined apply element is reduced such that that apply element releases (hereinafter this apply element will be referred to as the "release-side apply element"), while hydraulic pressure applied to another predetermined apply element is increased according to a hydraulic pressure command value such that that apply element applies (hereinafter this apply element will be referred to as the "apply-side apply element"). The apply and release of these apply elements in this way results in a gear shift that is based on the shift command.

Here, when applying the apply-side apply element while releasing the release-side apply element for an upshift, i.e., a shift into a higher gear, in the automatic transmission, the inertia phase that results from applying the apply-side apply element must start at just the right time in order for that upshift to be smooth. Incidentally, the inertia phase is a period of time from when the input rotation speed of the automatic transmission starts to fall after the apply-side apply element starts to be applied, until the apply-side apply element is completely applied. The timing at which this inertia phase starts (also referred to as the "inertia phase start timing") changes depending on the hydraulic pressure command value, which is the command value for the hydraulic pressure applied to the apply-side apply element. That is, as the hydraulic pressure command value increases, the hydraulic pressure applied to the apply-side apply element increases faster so the inertia phase starts sooner. Conversely, as the hydraulic pressure command value decreases, the hydraulic pressure applied to the apply-side apply element increases slower so the inertia phase starts later.

Accordingly, when the inertia phase starts, the hydraulic pressure command value is increased or decreased so that the period of time from when an upshift command is output until the inertia phase starts comes to match a target value (i.e., which corresponds to an appropriate time to start the inertia phase), and that increased or decreased hydraulic pressure command value is learned as a learning value. Learning the hydraulic pressure command value in this way enables the hydraulic pressure command value to be optimized in order to make the period of time match the target value. The inertia phase is then able to be started at an appropriate timing by increasing the hydraulic pressure of the apply-side apply element based on that hydraulic pressure command value. Incidentally, the hydraulic pressure command value is prepared and learned for each type of upshift in the automatic transmission, e.g., for an upshift from 1st gear into 2nd gear, an upshift from 2nd gear into 3rd gear, an upshift from 3rd gear into 4th gear, an upshift from 4th gear into 5th gear, and an upshift from 5th gear into 6th gear, and the like.

Also, in addition to learning the hydraulic pressure command value, other types of learning related to shifting gears in an automatic transmission are also known. For example, Japanese Patent Application Publication No. 11-37267 (JP-A-11-37267) describes technology that learns a release rate of an apply element to be released from an applied state in response to a shift command, so that the release rate becomes a value that prevents overshooting of the input rotation speed of the automatic transmission. Incidentally, this learning is prohibited when a throttle valve opening amount changes in response to an accelerator operation.

Also, Japanese Patent No. 3536537 describes technology that learn-corrects the apply pressure decrease rate, the hold time, and the rapidly decreasing value of an apply element to be released from an applied state in response to a shift command. Incidentally, this learning is prohibited when the engine speed is overshot due to the wheels slipping during an upshift.

Further, Japanese Patent No. 2615889 describes technology that learns a line pressure, which is the base pressure of hydraulic fluid supplied to apply elements, such that the inertia phase period, which is the period of time from when an apply element that is to be applied from a released state starts to apply in response to a shift command, until that apply element is completely applied, is appropriate. Incidentally, this learning is prohibited when the input characteristics of the automatic transmission with respect to engine load are different from what they normally are, such as when driving an air-conditioner compressor in the vehicle, when driving power steering in the vehicle, or when the engine is running in an environment where the air pressure is low.

When applying the apply-side apply element to shift the automatic transmission into a higher gear, the force required to apply that apply-side apply element can be reduced by reducing the input rotation speed of the automatic transmission (i.e., the speed of the internal combustion engine), which is done by reducing the output torque of the engine for that apply operation. Further, heat generated from friction when applying the apply-side apply element can also be kept low. In order to obtain these kinds of effects, when applying the apply-side apply element to shift the automatic transmission into a higher gear, the throttle valve of the internal combustion engine is controlled so that the opening amount thereof decreases to reduce the output torque of the internal combustion engine for that apply operation.

However, even when the throttle valve is controlled in this way, i.e., such that the opening amount thereof is reduced, a certain amount of delay until the output torque of the internal combustion engine actually decreases from reducing the amount of intake air drawn into the engine by reducing the opening amount of the throttle valve is unavoidable. Accordingly, the control to reduce the opening amount of the throttle valve is started somewhat early taking into account this delay in the reduction of output torque from the internal combustion engine. However, if the control to reduce the opening amount of the throttle valve is started early, when the input rotation speed of the automatic transmission (i.e., the engine speed) decreases as a result of the decrease in output torque from the internal combustion engine following execution of that control, that decrease in the input rotation speed of the automatic transmission may be erroneously interpreted as the start of the inertia phase, and as a result erroneous learning of the hydraulic pressure command value may be performed.

Incidentally, although JP-A-11-37267, Japanese Patent No. 3536537, and Japanese Patent No. 2615889 all mention the prohibiting of learning, even if the technologies relating to the prohibiting of learning in those publications were to be employed, erroneous learning of the hydraulic pressure command value could not be prevented. This is because the learning targets in those publications are targets other than the hydraulic pressure command value described above, so even if learning according to the prohibiting conditions described in those publications is prohibited, the hydraulic pressure command value is still learned regardless of that fact when the control to reduce the opening amount of the throttle valve is executed.

SUMMARY OF THE INVENTION

This invention thus provides a vehicle control apparatus and a vehicle control method, which can prevent erroneous learning of a hydraulic pressure command value used when increasing hydraulic pressure applied to an apply element in order to apply that apply element so as to shift an automatic transmission into a higher gear.

A first aspect of the invention relates to a vehicular control apparatus applied to a vehicle provided with an automatic transmission which is connected to an internal combustion engine and inputs rotation from the internal combustion engine, as well as establishes a plurality of gears, each having a different gear ratio, by selectively applying a plurality of apply elements. This vehicular control apparatus includes a shifting device which, in response to a command to shift into a higher gear, shifts into the higher gear by reducing hydraulic pressure that is applied to a predetermined first apply element from among the plurality of apply elements such that the first apply element releases, while increasing the hydraulic pressure that is applied to a predetermined second apply element based on a hydraulic pressure command value such that the second apply element applies; a torque reducing device which, when applying the second apply element in order to shift into the higher gear, reduces output torque of the internal combustion engine by controlling a throttle valve of the internal combustion engine such that an opening amount of the throttle valve decreases; a determining device that determines whether an inertia phase that occurs when the second apply element is applied has started based on whether an input rotation speed of the automatic transmission has decreased; a learning device which, at the start of the inertia phase, selectively increases or decreases the hydraulic pressure command value such that a period of time from when the command to shift into the higher gear is output until the inertia phase starts comes to match a target value, and learns the hydraulic pressure command value after that increase or decrease as a learning value; and a prohibiting device which, when it is determined by the determining device that the inertia phase has started, prohibits learning of the hydraulic pressure command value by the learning device when the output torque of the internal combustion engine is being reduced by the torque reducing device.

Also, a second aspect of the invention relates to a vehicular control method applied to a vehicle provided with an automatic transmission which is connected to an internal combustion engine and inputs rotation from the internal combustion engine, as well as establishes a plurality of gears, each having a different gear ratio, by selectively applying a plurality of apply elements. This vehicular control method includes shifting into a higher gear, in response to a command to shift into the higher gear, by reducing hydraulic pressure that is applied to a predetermined first apply element from among the plurality of apply elements such that the first apply element releases, while increasing the hydraulic pressure that is applied to a predetermined second apply element based on a hydraulic pressure command value such that the second apply element applies; reducing, when applying the second apply element in order to shift into the higher gear, output torque of the internal combustion engine by controlling a throttle valve of the internal combustion engine such that an opening amount of the throttle valve decreases; determining whether an inertia phase that occurs when the second apply element is applied has started based on whether an input rotation speed of the automatic transmission has decreased; selectively increasing or decreasing, at the start of the inertia phase, the hydraulic pressure command value such that a period of time from when the command to shift into the higher gear is output until the inertia phase starts comes to match a target value, and learning the hydraulic pressure command value after that increase or decrease as a learning value; and prohibiting, when is determined that the inertia phase has started, learning of the hydraulic pressure command value when the output torque of the internal combustion engine is being reduced.

The determination that the inertia phase, which occurs when the second apply element is applied in order to shift the automatic transmission into a higher gear, has started is made based on the fact that the input rotation speed of the automatic transmission has started to decrease. Here, if the control to decrease the throttle opening amount is being performed when it is determined that the inertia phase has started, it is highly likely that that determination is erroneous because the control to decrease the throttle opening amount causes the output torque of the internal combustion engine to drop which in turn reduces the input rotation speed of the automatic transmission (i.e., the engine speed). If the hydraulic pressure command value used when increasing the hydraulic pressure applied to the second apply element to apply that apply element is learned when it is highly likely that the determination that the inertia phase has started is erroneous in this way, the learned hydraulic pressure command value may be erroneous. However, according to the foregoing vehicular control apparatus and vehicular control method, learning of the hydraulic pressure command value is prohibited when the output torque from the internal combustion engine is being reduced through control by the torque reducing control which the opening amount of the throttle valve is reduced. As a result, the problem of erroneously learning the hydraulic pressure command value in this way can be avoided.

Also, in the foregoing vehicular control apparatus and vehicular control method, the next start timing of the control to decrease the opening amount of the throttle valve may be delayed compared to the last start timing based on the learning of the hydraulic pressure command value being prohibited by the prohibiting device. Further, the next start timing may be delayed a predetermined period of time compared to the last start timing. Moreover, the predetermined period of time may be a constant value or a variable value.

When the learning of the hydraulic pressure command value is prohibited it means that the start of the control to decrease the opening amount of the throttle valve to reduce the output torque of the internal combustion engine is too early. Therefore, according to the foregoing vehicular control apparatus and vehicular control method, when the learning of the hydraulic pressure command value is prohibited, the next start timing of the control to decrease the opening amount of the throttle valve is consequently delayed compared to the last start timing so the start timing of that control will not be too early. Therefore, the next time there is an opportunity to learn the hydraulic pressure command value, that learning can be inhibited from being prohibited to suppress a decrease in the learning frequency of the hydraulic pressure command value due to the learning of the hydraulic pressure command value being prohibited.

BRIEF DESCRIPTION OF THE DRAWINGS

The features, advantages, and technical and industrial significance of this invention will better understood by reading the following detailed description of preferred embodiments of the invention, when considered in connection with the accompanying drawings, in which.

DETAILED DESCRIPTION OF THE EMBODIMENTS

Figure 1:
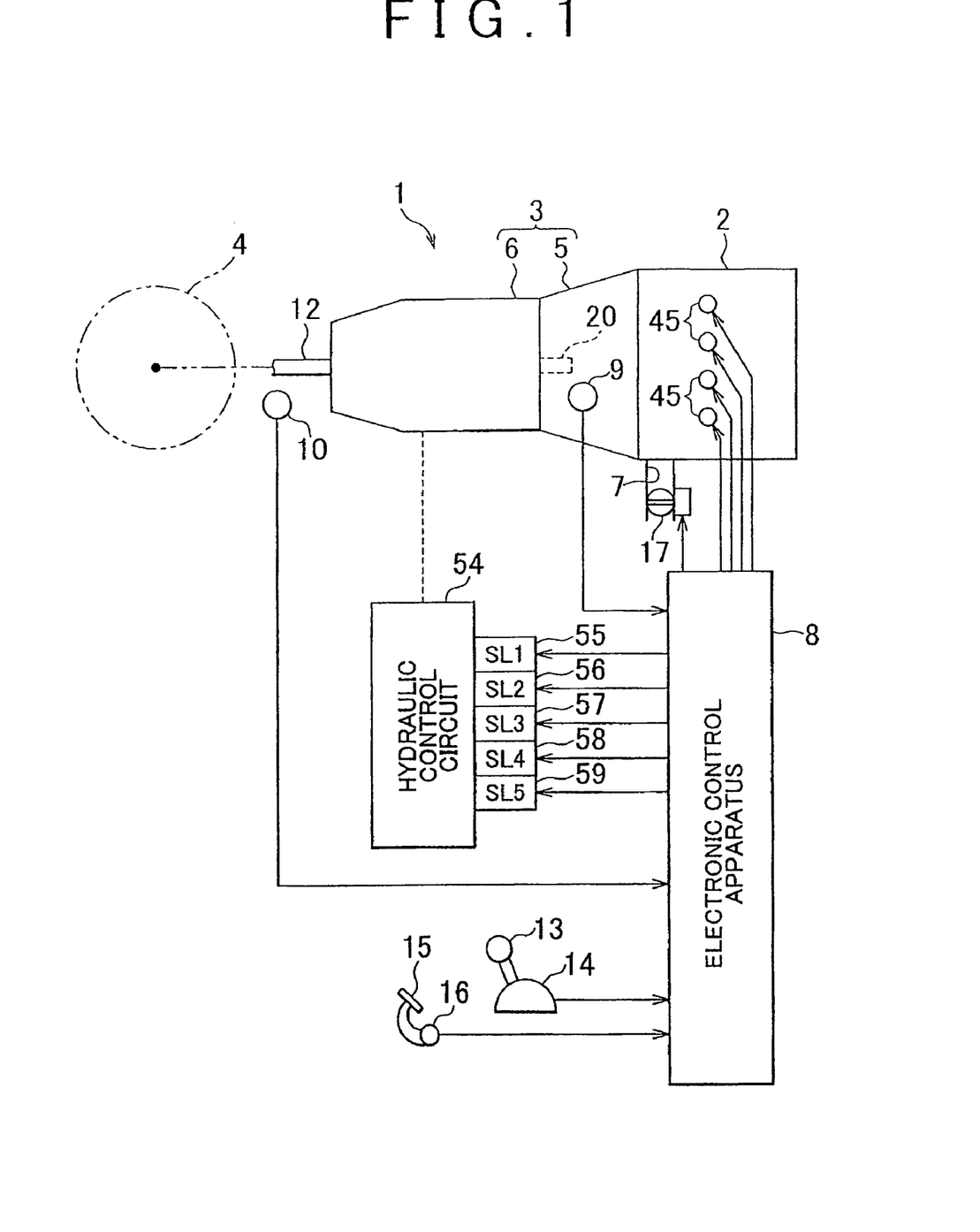
FIG. 1 is a schematic diagram showing an overall drive system of a vehicle to which a control apparatus according to an example embodiment of the invention can be applied.

In the following description and the accompanying drawings, the present invention will be described in greater detail with reference to example embodiments. As shown in FIG. 1, in a vehicle 1, the rotation of an engine 2 is transmitted to wheels 4 via an automatic transmission 3 and the like. In the engine 2, the intake air amount is adjusted by adjusting the opening amount of a throttle valve 17 provided in an intake passage 7, and fuel of a quantity corresponding to that intake air amount is injected from a fuel injection valve 45. The intake air and the fuel mix to form an air-fuel mixture which is then combusted, and the power obtained from that combustion drives the engine 2. Also, the automatic transmission 3 includes a torque converter 5 and a gear shift mechanism 6, and establishes a plurality of gears with different gear ratios by selectively applying a plurality of apply elements such as clutches and brakes so as to switch the power transmitting path in the gear shift mechanism.

Figure 2:
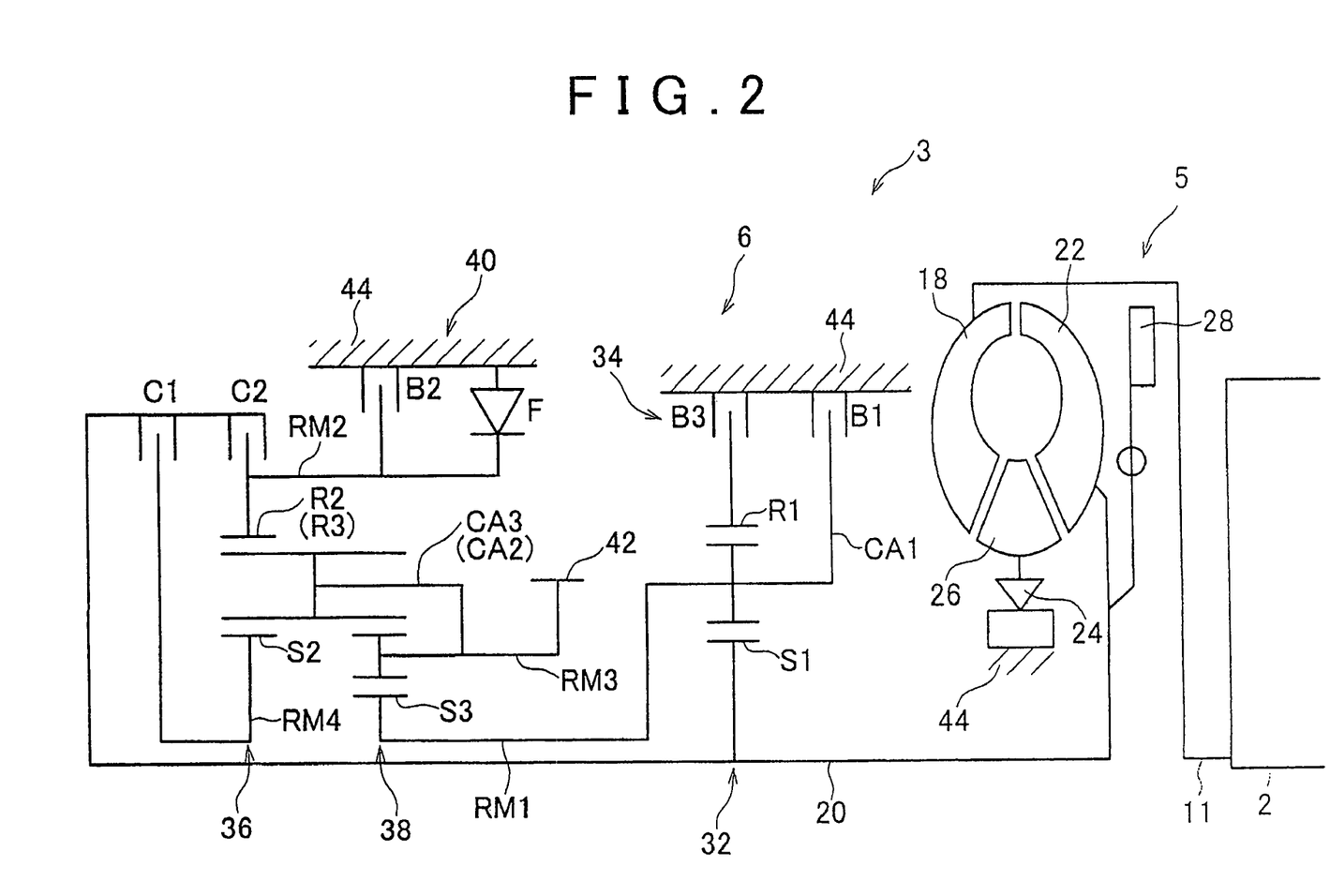
FIG. 2 is a skeleton drawing that illustrates the structure of an automatic transmission to which the control apparatus according to the example embodiment of the invention can be applied.

FIG. 2 is a skeleton view showing the structure of the automatic transmission 3. Incidentally, this automatic transmission 3 has a structure that is generally vertically symmetrical with respect to a center line. Accordingly, the portion below the center line is omitted in FIG. 2.

As shown in the FIG. 2, the automatic transmission 3 includes the torque converter 5 that transmits power between the engine 2 side and the gear shift mechanism 6 side using hydraulic fluid, and a lockup clutch 28 that can directly connect (i.e., lock) a crankshaft 11 of the engine 2 to a turbine shaft 20 which serves as an input shaft of the gear shift mechanism 6. The torque converter 5 includes a pump impeller 18 that is connected to the crankshaft 11 of the engine 2, a turbine runner 22 that is connected to the turbine shaft 20 that serves as the input shaft of the gear shift mechanism 6, and a stator 26 that is prevented from rotating in one direction by a one-way clutch 24. The hydraulic fluid is provided between the pump impeller 18 and the turbine runner 22. This hydraulic fluid is used to transmit power between the engine 2 side and the gear shift mechanism 6 side. Also, a hydraulic pump, not shown, is connected to the pump impeller 18. This hydraulic pump is operatively linked to the engine 2 and pumps hydraulic fluid at a predetermined base pressure which is supplied to a hydraulic control circuit 54, which will be described later, the lockup clutch 28, and various portions of the automatic transmission 3 that need to be lubricated.

The gear shift mechanism 6 includes a first transmitting portion 34 and a second transmitting portion 40 that are arranged on the same axis. The first transmitting portion 34 is mainly formed of a single pinion type first planetary gear set 32, while the second transmitting portion 40 is mainly formed of a single pinion type second planetary gear set 36 and a double pinion type third planetary gear set 38. This gear shift mechanism 6 is able to establish predetermined gears by selectively applying two apply elements from among a plurality of apply elements, i.e., a first clutch C1, a second clutch C2, a first brake B1, a second brake B2, and a third brake B3. Also, the first clutch C1, the second clutch C2, the first brake B1, the second brake B2, and the third brake B3 are all multiple disc hydraulic friction apply devices that frictionally apply using hydraulic cylinders. In this gear shift mechanism 6, the speed of the rotation input from the turbine shaft 20 is changed at a predetermined gear ratio that corresponds to the established gear, and then transmitted to the wheels 4 of the vehicle 1 via an output gear 42, a differential gear, not shown, and an output shaft 12 (see FIG. 1). The first planetary gear set 32 that makes up the first transmitting portion 34 includes three rotating elements, i.e., a sun gear S1, a carrier CA1, and a ring gear R1. The sun gear S1 is integrally connected to the turbine shaft 20 so that it rotates together with it. When the ring gear R1 is fixed by the third brake B3 to a housing 44 so as to be held against rotation, the carrier CA1 rotates at a slower speed than the turbine shaft 20.

Also, portions of the second planetary gear set 36 and the third planetary gear set 38, which make up the second transmitting portion 40, are connected together and form four rotating elements RM1, RM2, RM3, and RM4. More specifically, the sun gear S3 of the third planetary gear set 38 makes up the first rotating element RM1, the ring gear R2 of the second planetary gear set 36 and the ring gear R3 of the third planetary gear set 38 are connected together and make up the second rotating element RM2. Also, the carrier CA2 of the second planetary gear set 36 and the carrier CA3 of the third planetary gear set 38 are connected together and make up the third rotating element RM3, and the sun gear S2 of the second planetary gear set 36 makes up the fourth rotating element RM4. That is, the second planetary gear set 36 and the third planetary gear set 38 together make up a Ravigneaux type planetary gear train in which the carriers CA2 and CA3 are integrally formed together, the ring gear R2 and R3 are formed by a common member, and the pinion gears of the second planetary gear set 36 also serve as second pinion gears of the third planetary gear set 38.

The first rotating element RM1 can be selectively connected to the housing 44 by the first brake B1, and the second rotating element RM2 can be selectively connected to the housing 44 by the second brake B2, thereby preventing relative rotation of the first and second rotating elements RM1 and RM2. The fourth rotating element RM4 can be selectively connected to the turbine shaft 20 by the first clutch C1, and the second rotating element RM2 can be selectively connected to the turbine shaft 20 by the second clutch C2, such that the fourth rotating element RM4 and the second rotating element RM2 can be made to rotate together with the turbine shaft 20. The first rotating element RM1 is integrally connected to the carrier CA1 of the first planetary gear set 32 so it rotates together with the carrier CA1, and the third rotating element RM3 is integrally connected to the output gear 42 so it rotates together with the output gear 42 to output power. Incidentally, a one-way clutch F that prevents the second rotating element RM2 from rotating in reverse while allowing it to rotate normally, i.e., in the same direction as the direction in which the turbine shaft 20 rotates, is provided in parallel with the second brake B2 between the second rotating element RM2 and the housing 44.

Figure 3:
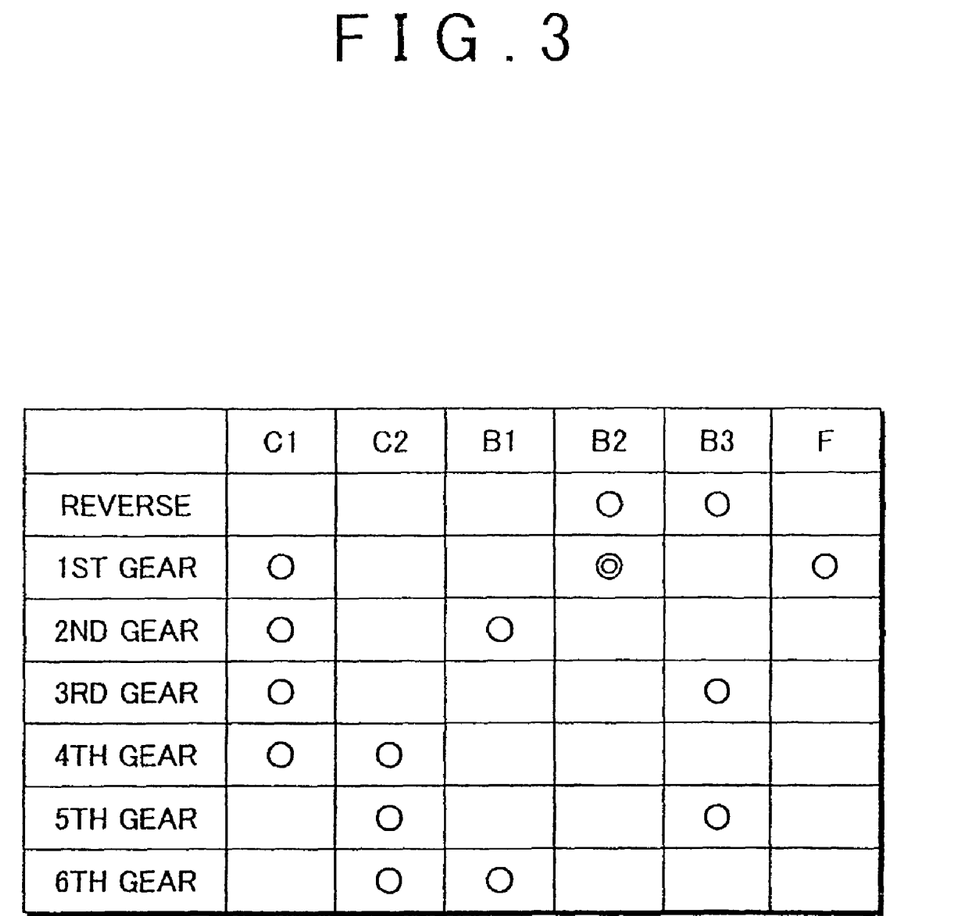
FIG. 3 is a clutch and brake application chart showing various apply and release combinations of clutches and brakes to achieve specific gears in the automatic transmission.

The clutch and brake application chart in FIG. 3 shows the relationships between the operating states of the apply elements, i.e., the first clutch C1, the second clutch C2, the first brake B 1, the second brake B2, and the third brake B3, and the gears (i.e., reverse, 1st gear through 6th gear) that can be established. In the chart, a circle indicates that the clutch or brake is applied and a double circle (i.e., bulls-eye) indicates that the clutch or brake is applied during engine braking or the like. Incidentally, the gear ratio of reverse, which is the gear for running the vehicle in reverse, and the gear ratios for 1st gear through 6th gear, which are gears for running the vehicle forward, are set appropriately according to the gear ratios of the first planetary gear set 32, the second planetary gear set 36, and the third planetary gear set 38.

The operating states of the apply elements when the gears are established, as well as the resultant operation of the gear shift mechanism 6 will hereinafter be described for each gear, i.e., reverse, and 1st gear through 6th gear. When establishing reverse which is the gear for running the vehicle in reverse, both the second brake B2 and the third brake B3 are applied. Accordingly, the second rotating element RM2 is prevented from rotating relative to the housing 44 and the first rotating element RM1 rotates slower than the first transmitting portion 34 such that reverse, which is a reverse gear for running the vehicle in reverse, is established and the third rotating element RM3 rotates in reverse at a speed that corresponds to reverse.

When establishing first gear which is the lowest forward gear, the first clutch C1 and the second brake B2 are both applied. However, during acceleration, the second brake B2 does not necessarily have to be applied as described above. This is because the second brake B2 and the one-way clutch F are provided in parallel as described above, and during acceleration the one-way clutch F operates just like the second brake B2 does when it is applied. When the first clutch C1 and either the second brake B2 or the one-way clutch F are applied, the fourth rotating element RM4 rotates together with the turbine shaft 20 while the second rotating element RM2 is prevented from rotating with respect to the housing 44 such that 1st gear, which is a forward gear for making the vehicle run forward, is established. As a result, the third rotating element RM3 that is connected to the output gear 42 rotates at a speed corresponding to 1st gear.

When establishing 2nd gear, which is a gear having a higher gear ratio than 1st gear, the first clutch C1 and the first brake B1 are both applied. Accordingly, the fourth rotating element RM4 rotates together with the turbine shaft 20 while the first rotating element RM1 is prevented from rotating relative to the housing 44 such that 2nd gear, which is a forward gear, is established. As a result, the third rotating element RM3 rotates at a speed corresponding to 2nd gear.

When establishing 3rd gear, which is a gear having a higher gear ratio than 2nd gear, the first clutch C1 and the third brake B3 are both applied. Accordingly, the fourth rotating element RM4 rotates together with the turbine shaft 20 while the first rotating element RM1 rotates at a slower speed than the first transmitting portion 34. As a result, 3rd gear, which is a forward gear, is established and the third rotating element RM3 rotates at a speed corresponding to 3rd gear.

When establishing 4th gear, which is a gear having a higher gear ratio than 3rd gear, the first clutch C1 and the second clutch C2 are both applied such that the second transmitting portion 40 rotates together with the turbine shaft 20. As a result, 4th gear, which is a forward gear, is established and the third rotating element RM3 rotates at a speed corresponding to 4th gear.

When establishing 5th gear, which is a gear having a higher gear ratio than 4th gear, the second clutch C2 and the third brake B3 are both applied such that the second rotating element RM2 rotates together with the turbine shaft 20 while the first rotating element RM1 rotates at a slower speed than the first transmitting portion 34. As a result, 5th gear, which is a forward gear, is established and the third rotating element RM3 rotates at a speed corresponding to 5th gear.

When establishing 6th gear, which is a gear having a higher gear ratio than 5th gear, the second clutch C2 and the first brake B1 are both applied such that the second rotating element RM2 rotates together with the turbine shaft 20 while the first rotating element RM1 is prevented from rotating relative to the housing 44. As a result, 6th gear, which is a forward gear, is established and the third rotating element RM3 rotates at a speed corresponding to 6th gear.

Next, the electrical configuration of a control apparatus of the vehicle 1 in this example embodiment will be described with reference to FIG. 1. The vehicle 1 has an electronic control apparatus 8 that executes various controls relating to the engine 2 and the automatic transmission 3 and the like. The electronic control apparatus 8 includes a CPU that executes various computations and processing related to these controls, ROM in which programs and data necessary for those controls are stored, RAM in which the computation results from the CPU and the like are temporarily stored, and input/output ports for inputting and outputting signals with respect to various equipment.

Various sensors and the like are connected to the input port of the electronic control apparatus 8. These sensors include an input rotation speed sensor 9, an output rotation speed sensor 10, a shift position sensor 14, and an accelerator position sensor 16. The input rotation speed sensor 9 detects the rotation speed of the turbine shaft 20 which serves as the input shaft of the gear shift mechanism 6.

The output rotation speed sensor 10 detects the rotation speed of the output shaft 12 of the gear shift mechanism 6. The shift position sensor 14 outputs a signal indicative of the position of a shift lever 13 that is operated by the driver of the vehicle 1.

The accelerator position sensor 16 detects the depression amount (i.e., accelerator depression amount) of an accelerator pedal 15 that is depressed by the driver. The output port of the electronic control apparatus 8 is connected to drive circuits of the throttle valve 17 and the fuel injection valve 45 of the engine 2, as well as to drive circuits of first to fifth solenoid valves 55 to 59 provided in the hydraulic control circuit 54 for shifting gears in the automatic transmission 3.

The hydraulic control circuit 54 supplies hydraulic fluid to the apply elements, i.e., the first clutch C1, the second clutch C2, the first brake B1, the second brake B2, and the third brake B3. Also, the first to the fifth solenoid valves 55 to 59 provided in the hydraulic control circuit 54 individually operate the corresponding apply elements, i.e., the first clutch C1, the second clutch C2, the first brake B1, the second brake B2, and the third brake B3, by adjusting the hydraulic pressures applied to those apply elements.

The electronic control apparatus 8 detects the operating states of the engine 2 and the vehicle 1 based on the detection signals received from the sensors and outputs command signals to the various drive circuits that are connected to the output port. In this way, the electronic control apparatus 8 executes throttle opening amount control and fuel injection quantity control of the engine 2, as well as gear shift control (i.e., shift control) of the automatic transmission 3 and the like.

The shift control of the automatic transmission 3 is realized by setting a specified gear (i.e., a gear specified by a command that is output), which is a gear suitable for the running state of the vehicle 1, based on the accelerator depression amount, vehicle speed, and shift lever position and the like, and individually operating the first to fifth solenoid valves 55 to 59 to apply or release the apply elements so as to establish that specified gear in the automatic transmission 3. Incidentally, the vehicle speed used in this shift control may be obtained based on the detection signal from the output rotation speed sensor 10, or the detection signal from the input rotation speed 9 and the current gear. Performing shift control in this manner enables a gear that is appropriate for the running state of the vehicle 1 to be established in the automatic transmission 3. The gear that is established in this way is a gear having a higher gear ratio as the vehicle speed increases, i.e., the gear changes from 1st gear up to 6th gear as necessary as the vehicle speed increases, under the condition that the accelerator operation amount is constant while the vehicle 1 is traveling forward.

When shifting the automatic transmission 3 into the specified gear that is set, hydraulic pressure applied to a predetermined apply element is reduced such that that apply element releases (hereinafter this apply element may also be referred to as the "release-side apply element"), while the hydraulic pressure applied to another predetermined apply element is increased based on a hydraulic pressure command value such that that apply element applies (hereinafter this apply element may also be referred to as the "apply-side apply element"), according to the set specified gear. The apply and release of these apply elements in this way results in a gear shift into that specified gear. For example, when the automatic transmission 3 is in 2nd gear and the specified gear is 3rd gear such that the automatic transmission 3 will shift from 2nd gear into 3rd gear, the hydraulic pressure that is applied to the first brake B1 is reduced such that the first brake B1 is released, while hydraulic pressure that is applied to the third brake B3 is increased based on the hydraulic pressure command value such that the third brake B3 becomes applied, as is shown in the clutch and brake application chart in FIG. 3.

Here, the routine for executing shift control of the automatic transmission 3 when shifting the automatic transmission 3 into a higher gear will be described with respect to a shift from 2nd gear into third gear, with reference to the time charts shown in FIGS. 4A to 4F.

Figure 4A:
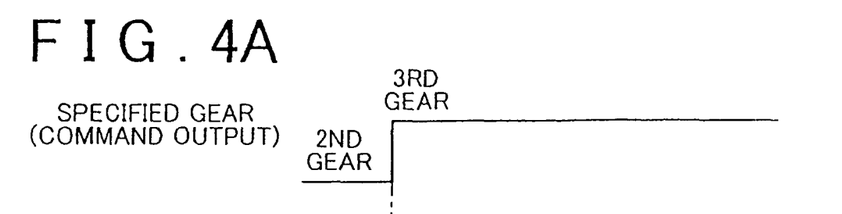
FIG. 4A is a time chart showing a change in the specified gear according to a command that is output when shifting the automatic transmission into a higher gear.
Figures 4B, 4C:
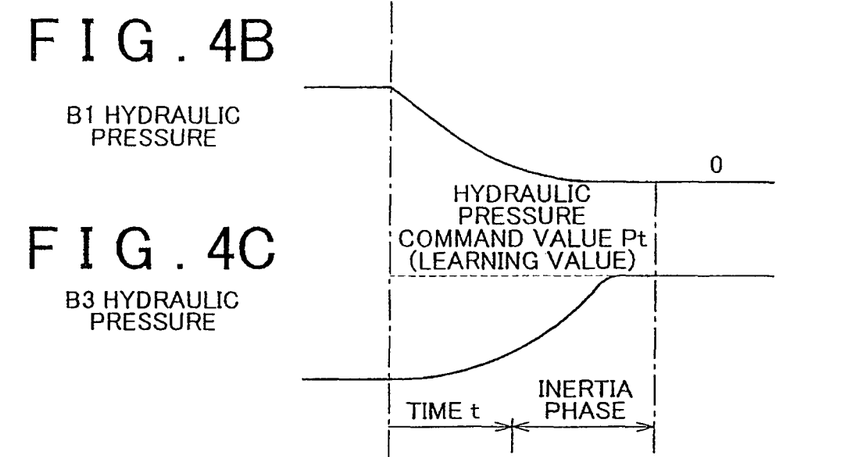
FIG. 4B is a time chart illustrating a change in the hydraulic pressure applied to a first brake.
FIG. 4C is a time chart illustrating a change in the hydraulic pressure applied to a third brake.
Figure 4D:
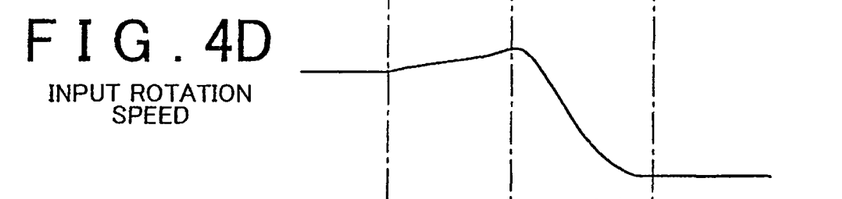
FIG. 4D is a time chart illustrating a change in the input rotation speed.
Figure 4E:
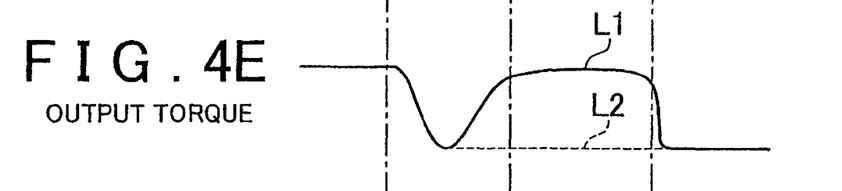
FIG. 4E is a time chart illustrating a change in the output torque.
Figure 4F:
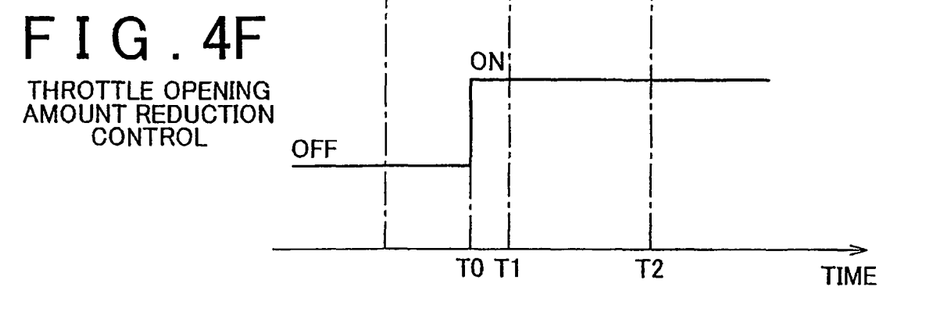
FIG. 4F is a time chart illustrating the execution mode of throttle opening amount reduction control.

FIG. 4A shows a change in the specified gear according to a command that is output, FIG. 4B shows the change in the hydraulic pressure applied to the first brake B 1, and FIG. 4C shows the change in the hydraulic pressure applied to the third brake B3. Also, FIG. 4D shows the change in the rotation speed of the turbine shaft 20 (i.e., the input rotation speed) of the automatic transmission 3, FIG. 4E shows the change in the torque applied to the output shaft 12 (i.e., the output torque) of the automatic transmission 3, and FIG. 4F shows the execution mode of throttle opening amount reduction control which will be described later.

As shown in FIG. 4A, when a command is output to change the specified gear from 2nd gear to 3rd gear, the hydraulic pressure applied to the first brake B1 gradually decreases, as shown in FIG. 4B, while the hydraulic pressure applied to the third brake B3 gradually increases based on a hydraulic pressure command value Pt, as shown in FIG. 4C, such that the automatic transmission 3 which is in 2nd gear shifts into 3rd gear to match the specified gear. This hydraulic pressure command value Pt is a command value that increases the hydraulic pressure applied to the apply-side apply element (which is third brake B3 in this example) when applying that apply-side apply element in order to shift into the higher gear. The automatic transmission 3 then shifts from 2nd gear into 3rd gear by increasing the hydraulic pressure applied to that apply-side apply element so that it becomes completely applied. Incidentally, when shifting from 2nd gear into 3rd gear, the input rotation speed of the automatic transmission 3 changes in the manner shown in FIG. 4D, and the output torque of the automatic transmission 3 changes in the manner shown by the solid line L1 in FIG. 4E.

Here, when applying the third brake B3 while releasing the first brake B1 in order to shift the automatic transmission 3 into the higher gear, or more specifically, from 2nd gear into 3rd gear, the inertia phase that results from applying the third brake B3 must start at just the right time for that shift to be smooth. Incidentally, the inertia phase is the period from the time the input rotation speed of the automatic transmission 3 starts to fall (i.e., timing T1) after the third brake B3 starts to be applied until the time the third brake B3 is completely applied (i.e., timing T2). The timing at which this inertia phase starts (also referred to as the "inertia phase start timing") changes depending on the hydraulic pressure command value Pt which is the command value for the hydraulic pressure applied to the third brake B3. That is, as the hydraulic pressure command value Pt increases, the hydraulic pressure applied to the third brake B3 increases faster so the inertia phase starts sooner. Conversely, as the hydraulic pressure command value Pt decreases, the hydraulic pressure applied to the third brake B3 increases slower so the inertia phase starts later.

Accordingly, when the inertia phase starts, the hydraulic pressure command value Pt is increased or decreased so that the period of time t from the time the command for the upshift into the specified gear is output until the inertia phase starts comes to match a target value t1 (i.e., corresponds to an appropriate time to start the inertia phase), and that increased or decreased hydraulic pressure command value Pt is learned as a learning value. Learning the hydraulic pressure command value Pt in this way enables the hydraulic pressure command value Pt to be optimized for making the period of time t match the target value t1. The inertia phase is then able to be started at an appropriate timing by increasing the hydraulic pressure of the third brake B3 based on that hydraulic pressure command value Pt. Incidentally, the hydraulic pressure command value Pt is prepared and learned for each type of upshift in the automatic transmission 3, i.e., for an upshift from 1st gear into 2nd gear, an upshift from 2nd gear into 3rd gear, an upshift from 3rd gear into 4th gear, an upshift from 4th gear into 5th gear, and an upshift from 5th gear into 6th gear, and the like.

When applying the apply-side apply element (i.e., the third brake B3 in the example shown in FIGS. 4A to 4F) to shift the automatic transmission 3 into a higher gear, the force required to apply that apply-side apply element can be reduced by reducing the input rotation speed of the automatic transmission 3 (i.e., the engine speed), which is done by reducing the output torque of the engine 2 for that apply operation. Moreover, heat generated by friction when applying the apply-side apply element can also be kept low. Incidentally, the change in the output torque of the automatic transmission 3 at this time is as shown by the broken line L2 in FIG. 4E. The force required to apply the apply-side apply element can be reduced an amount corresponding to the difference between that broken line L2 and the solid line L1, and the amount of heat generated by friction at that time can also be reduced.

In order to obtain these kinds of effects, when applying the apply-side apply element to shift the automatic transmission 3 into a higher gear, the throttle valve 17 is controlled so that the opening amount thereof decreases to reduce the output torque of the engine 2 for that apply operation (hereinafter this control will be referred to as "throttle opening amount reduction control"). When the throttle valve 17 is controlled according to this throttle opening amount reduction control so that its opening amount decreases in this way, the amount of intake air that is drawn into the engine 2 decreases, and accordingly, the amount of fuel that is injected from the fuel injection valve 45 also decreases. As a result, the output torque of the engine 2 that is driven by combusting the air-fuel mixture of that air and fuel decreases.

However, even when the throttle valve 17 is controlled so that its opening amount is reduced by the throttle opening amount reduction control, a certain amount of delay until the output torque of the engine 2 actually decreases from reducing the amount of intake air drawn into the engine 2 by reducing the opening amount of the throttle valve is unavoidable. Accordingly, the throttle opening amount reduction control is started somewhat early (T0) compared with the timing at which the inertia phase starts (T1), as shown in FIG. 4F, for example, taking into account this delay in the reduction of output torque from the engine 2.

However, if the throttle opening amount reduction control is started too early, there is a possibility that when the input rotation speed of the automatic transmission 3 (i.e., the engine speed) decreases following execution of that control before the inertia phase starts, that decrease may be erroneously interpreted as the start of the inertia phase. As a result, the period of time t from the time the command for the upshift into the specified gear is output until the inertia phase starts that is obtained may be incorrect. Consequently, the hydraulic pressure command value Pt that is learned after being increased or decreased so that the period of time t comes to match the target value may also be incorrect, i.e., an inappropriate value may be learned.

Accordingly, in this example embodiment, when it is determined that the inertia phase has started based on the fact that the input rotation speed of the automatic transmission 3 has started to decrease, learning of the hydraulic pressure command value Pt based on the period of time t from the time the command for the upshift into the specified gear is output until the inertia phase starts is prohibited when executing throttle opening amount reduction control to reduce the output torque of the engine 2. Accordingly, the problem of erroneously learning the hydraulic pressure command value Pt in this way can be avoided.

Figure 5:
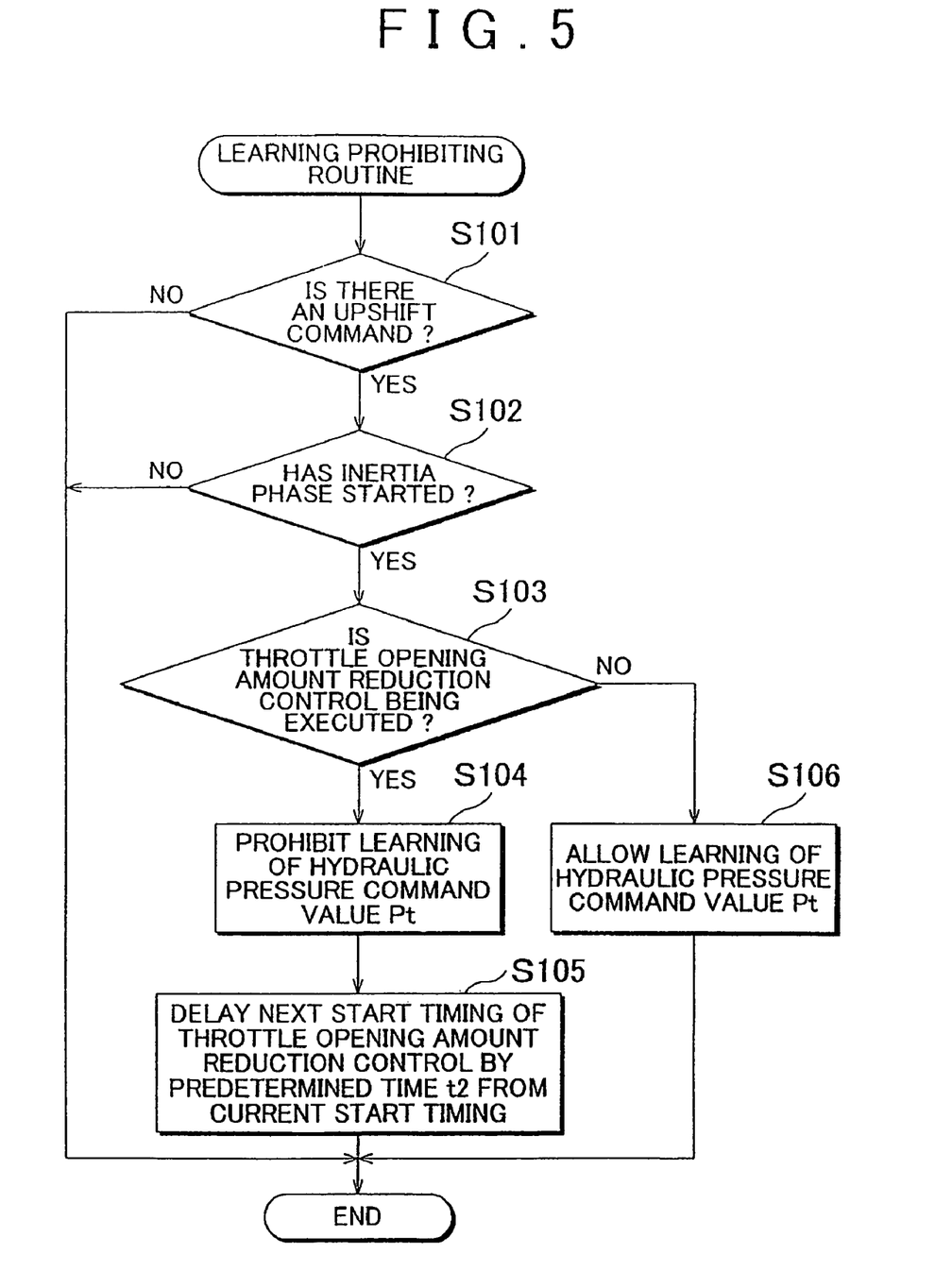
FIG. 5 is a flowchart illustrating a routine for prohibiting learning of the hydraulic pressure command value.

Next, the routine for prohibiting the learning of the hydraulic pressure command value Pt will be described in detail with reference to the flowchart shown in FIG. 5 that shows this learning prohibiting routine. This learning prohibiting routine is executed by the electronic control apparatus 8 in cycles at predetermined intervals of time, for example.

In this routine, it is first determined whether there is a command to shift into a higher gear (also simply referred to as an "upshift command") (step S101), i.e., it is determined whether the gear specified by the command (i.e., the specified gear) has changed to a higher gear. If the determination is yes, then it is determined whether the inertia phase has started based on whether the input rotation speed of the automatic transmission 3 has started to decrease (step S102). If it is determined that the inertia phase has started based on the fact that the input rotation speed has started to decrease, it is then determined whether the throttle opening amount reduction control is being executed (step S103). If the determination in step S103 is no, then learning of the hydraulic pressure command value Pt is allowed (step S106). If, on the other hand, the determination in step S103 is yes, then learning of the hydraulic pressure command value Pt is prohibited (step S104).

If the learning of the hydraulic pressure command value Pt is prohibited in step S104, then the next start timing of the throttle opening amount reduction control is delayed compared to the last start timing of the throttle opening amount reduction control (step S105). More specifically, the next start timing of the throttle opening amount reduction control is delayed a predetermined time t2 compared to the last start timing of the throttle opening amount reduction control. Accordingly, the start timing of the throttle opening amount reduction control is delayed the predetermined period of time t2 each time the learning of the hydraulic pressure command value Pt is prohibited. Incidentally, for this predetermined period of time t2, an optimum value determined through testing or the like is used which delays the start timing appropriately and not excessively.

The example embodiment described in detail above is able to achieve the following effects. (1) When shifting the automatic transmission 3 into a higher gear, the determination that the inertia phase has started is made based on the fact that the input rotation speed of the automatic transmission 3 has started to decrease. Here, if throttle opening amount reduction control is being performed to reduce the output torque from the engine when it is determined that the inertia phase has started, it is highly likely that that determination is erroneous because the throttle opening amount reduction control causes the input rotation speed of the automatic transmission 3 (i.e., the engine speed) to drop. When it is highly likely that the determination that the inertia phase has started is erroneous in this way, the learning of the hydraulic pressure command value Pt is prohibited. As a result, it is possible to prevent erroneous learning of the hydraulic pressure command value Pt that may otherwise occur due to the hydraulic pressure command value Pt being learned when it is likely that the determination that the inertia phase has started is erroneous.

(2) When the learning of the hydraulic pressure command value Pt is prohibited it means that the start of the throttle opening amount reduction control is too early. When the learning of the hydraulic pressure command value Pt is prohibited, the next start timing of the throttle opening amount reduction control is consequently delayed compared to the last start timing of the throttle opening amount reduction control so the start timing of that control will not be too early. Therefore, the next time there is an opportunity to learn the hydraulic pressure command value Pt, that learning can be inhibited from being prohibited to suppress a decrease in the learning frequency of the hydraulic pressure command value Pt due to the learning of the hydraulic pressure command value Pt being prohibited.

Incidentally, the foregoing example embodiment may also be modified as follows, for example. That is, it is not always necessary to delay the next start timing of the throttle opening amount reduction control based on the fact that the learning of the hydraulic pressure command value Pt is prohibited.

Also, the predetermined period of time t2 used to delay the start timing of the throttle opening amount reduction control may be modified as appropriate.

The invention claimed is:

1. A vehicular control apparatus applied to a vehicle provided with an automatic transmission which is connected to an internal combustion engine and receives rotation from the internal combustion engine, the automatic transmission establishing a plurality of gears, each having a different gear ratio, by selectively applying a plurality of apply elements, the vehicular control apparatus comprising:
   a shifting device that, in response to a command to shift into a higher gear, shifts into the higher gear by reducing a hydraulic pressure that is applied to a predetermined first apply element thereby releasing the first apply element, while increasing a hydraulic pressure that is applied to a predetermined second apply element based on a hydraulic pressure command value such that the second apply element applies;
   a torque reducing device that, when applying the second apply element in order to shift into the higher gear, reduces output torque of the internal combustion engine by controlling a throttle valve of the internal combustion engine such that an opening amount of the throttle valve decreases;
   a determining device that determines whether an inertia phase that occurs when the second apply element is applied has started based on whether an input rotation speed of the automatic transmission has decreased;
   a learning device that, at the start of the inertia phase, adjusts the hydraulic pressure command value such that a period of time from when the command to shift into the higher gear is output until the inertia phase starts comes to match a target value, and learns the adjusted hydraulic pressure command value as a learning value; and
   a prohibiting device that, when it is determined by the determining device that the inertia phase has started, prohibits learning of the hydraulic pressure command value by the learning device when the output torque of the internal combustion engine is being reduced by the torque reducing device;
   wherein the torque reducing device delays a next start timing of the control to decrease the opening amount of the throttle valve compared to a last start timing when the prohibiting device prohibits the learning of the hydraulic pressure command value.

2. The vehicular control apparatus according to claim 1, wherein the next start timing is delayed a predetermined period of time compared to the last start timing.

3. The vehicular control apparatus according to claim 2, wherein the predetermined period of time is a constant value.

4. The vehicular control apparatus according to claim 2, wherein the predetermined period of time is a variable value.

5. A vehicular control method applied to a vehicle provided with an automatic transmission which is connected to an internal combustion engine and receives rotation from the internal combustion engine, the automatic transmission establishing a plurality of gears, each having a different gear ratio, by selectively applying a plurality of apply elements, the vehicular control method comprising:
   shifting into a higher gear, in response to a command to shift into the higher gear, by reducing hydraulic pressure that is applied to a predetermined first apply element thereby releasing the first apply element, while increasing a hydraulic pressure that is applied to a predetermined second apply element based on a hydraulic pressure command value such that the second apply element applies;
   reducing, when applying the second apply element in order to shift into the higher gear, output torque of the internal combustion engine by controlling a throttle valve of the internal combustion engine such that an opening amount of the throttle valve decreases;
   determining whether an inertia phase that occurs when the second apply element is applied has started based on whether an input rotation speed of the automatic transmission has decreased;
   adjusting, at the start of the inertia phase, the hydraulic pressure command value such that a period of time from when the command to shift into the higher gear is output until the inertia phase starts comes to match a target value, and learning the adjusted hydraulic pressure command value a learning value;
   prohibiting, when it is determined that the inertia phase has started, learning of the hydraulic pressure command value when the output torque of the internal combustion engine is being reduced, and
   delaying a next start timing of the control to decrease the opening amount of the throttle valve compared to a last start timing in response to the prohibiting the learning of the hydraulic pressure command value.

6. The vehicular control method according to claim 5, wherein the next start timing is delayed a predetermined period of time compared to the last start timing.

* * * * *